March 14, 1967  V. A. McKIENZIE  3,309,563
LIGHTING SAFETY CIRCUIT FOR ENERGIZING THE SECONDARY
FILAMENT UPON THE FAILURE OF THE MAIN FILAMENT
Filed Oct. 28, 1963
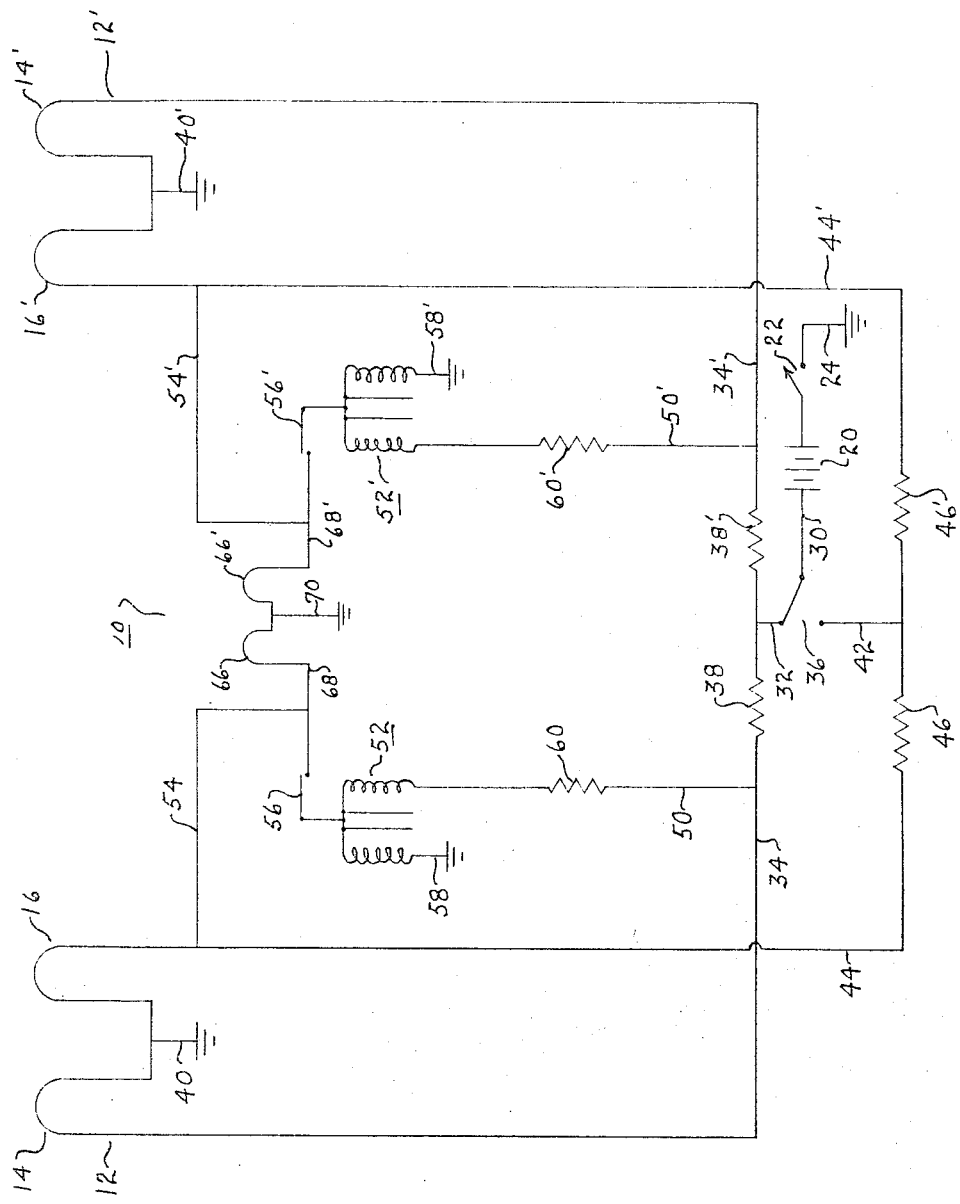
INVENTOR.
VETO A. MC KIENZIE
BY
Hobbs & Easton
ATTORNEYS

United States Patent Office 3,309,563
Patented Mar. 14, 1967

3,309,563
LIGHTING SAFETY CIRCUIT FOR ENERGIZING THE SECONDARY FILAMENT UPON THE FAILURE OF THE MAIN FILAMENT
Veto A. McKienzie, 216 W. 4th St., Buchanan, Mich. 49107
Filed Oct. 28, 1963, Ser. No. 319,481
4 Claims. (Cl. 315—83)

The present invention relates to a lighting safety device and more particularly to a device for energizing the secondary filament in a double-filament bulb upon failure of the main filament.

In the operation of an automobile at night, often one of the headlights fails, making it more difficult for the operator of the automobile to see the road ahead. Further, because it is impossible for the operator of an oncoming vehicle to determine at a distance whether it is the right or left headlight of the automobile that is not working, (it is difficult for him to ascertain the position of the automobile on the road and gauge accordingly the clearance it should be given, thereby increasing the chance of an accident. Also, the taillight of an automobile or other vehicle will often fail, usually without the knowledge of the operator of the vehicle. If the operator of the vehicle then wishes to turn and uses his taillight signals to indicate his intention, the operator of a vehicle following will not be cognizant of the intended turn because of the failure of the taillight, and there is a chance of an accident resulting. There are many other examples, such as in boat lighting, aircraft lighting, railway lighting, and the like, wherein a failure of a light may result in a possible accident or a situation which is otherwise dangerous or undesirable. It is therefore one of the principal objects of the present invention to provide a lighting safety device suitable for use in conjunction with automobile headlights and taillights, boat lighting, aircraft lighting, and the like, wherein a secondary filament in the lamp is energized automatically upon failure of the primary filament.

A further object of the invention is to provide a means whereby current is transferred in such a manner as to energize the second element in any unit with a double-element feature when the first element fails.

Automobile headlights are already provided with a double filament, one for a low beam and one for a high beam. Automobile taillights are also usually provided with a double filament, a dim filament for indicating turns and a bright filament for indicating a stop. It is therefore still another object of the invention to provide an automobile lighting safety device wherein, upon failure of the low-beam filament in a headlight or the dim filament in a taillight, the high-beam filament of the headlight or the bright filament of the taillight, respectively, is energized, the brilliancy of the high-beam or bright filament being reduced when employed as a substitute for the low-beam or dim filament.

Previous devices which have attempted to solve these problems have been complicated, unreliable, and difficult to install. It is therefore a further object of the invention to provide a lighting safety device wherein a secondary filament in the lamp is energized automatically upon failure of the primary filament, and which is relatively simple in construction, is compact and easily shipped, is easy to install in a short amount of time, and will sell for a moderate retail price.

Additional objects and advantages of the present invention will become apparent from the following description and accompanying drawing, wherein:

The figure in the drawing is a diagrammatic view of the present lighting safety device as it would be installed in conjunction with the headlights of an automobile.

Referring more specifically to the drawing, numeral 10 designates generally the present lighting safety device adapted to operate in conjunction with the conventional automobile headlights having low and high-beam filaments 14 and 16 in headlight 12 and 14' and 16' in headlight 12'. While the present lighting safety device is shown in conjunction with single headlights having high and low-beam filaments, the device can be used satisfactorily with separate high and low headlights and with a combination of those. The present lighting safety device permits both the right and left headlights and high and low-beam filaments to operate in their conventional manner until one or both of the low-beam filaments burn out, after which the high-beam filaments perform the function of both the high and low-beam filaments. In order that the driver will become aware of the defect in the lighting system when one or both of the low-beam filaments burn out, a signal light is preferably included in the system located in the driver compartment in a place readily visible to the driver. Consequently, when the driver learns from the signal light that one of the low-beam filaments has burned out, the automobile can safely be used until the lights can be repaired. In the drawing, the circuitry for the right headlight 12' is the same as the circuitry for the left headlight 12, hence, the same numerals with primes are given to the circuitry of the right headlight, and only the left headlight will be described in detail, the description thereof being equally applicable to the right headlight.

The wiring diagram shown in the drawings includes the conventional battery 20, ignition switch 22 and ground lead 24. The battery is connected to the low-beam filament 14 by leads 30, 32, and 34 with a dimming switch 36 in lead 32 and a resistor 38 in lead 34, the low-beam filament being connected through the headlight to a ground 40. The high-beam filament 16 is likewise connected to the battery and dimming switch through leads 42 and 44 and to ground 40, a resistor 46 being included in lead 44 to the high-beam filament.

The control circuit for shifting the low-beam 14 to the high-beam 16, in the event the low-beam is broken, consists of a lead 50 connected to lead 34, a relay 52 and lead 54 connected to the relay and to lead 44, the relay having a switch 56 closed by energization of the relay coil which is grounded by lead 58. A resistor 60 is included in lead 50 between lead 34 and relay 52 to reduce the current to the point where the relay will not be energized sufficiently to close switch 56 while the main circuit is operating normally. In the control circuit, relay 52 is constantly partially energized when the ignition switch is closed and the dimming light switch is connected to lead 32, by the current flowing through lead 50, relay 52 and the coil. When low-beam filament 14 is broken, the increased current available flows through resistor 38 and resistor 60 and is now sufficient to energize relay 52, thus closing switch 56 and permitting the current to flow through leads 54 and 44 to high-beam filament 16 to energize the high-beam filament in an amount corresponding in intensity of the low-beam filament.

In the event the driver wishes to use the high-beam, the dimming switch 36 is operated to connect lead 30 with lead 42, permitting the current to flow through resistor 46 and lead 44 to the high-beam filament. When this circuit is closed, the current is sufficient to increase the output of the high-beam filament to correspond to the conventional and required intensity. While the dimming switch is connected to leads 42 and 44, the current to and through relay 52 is broken, thus permitting switch 56 to open. However, when the dimming switch is operated to connect lead 30 with lead 32, the current is again sufficient to operate relay 52, thus closing switch 56 and energizing the high-beam filament corresponding to the conventional low-beam intensity. The signal light, which is mounted in the driver's compartment, consists of two filaments 66 and 66', each connected to the respective left and right circuits by leads 68 and 68', and to the ground by lead 70. When switch 56 is closed by the energization of relay 52, current flows from the switch through lead 68, and to ground 70, thus lighting filament 66 and indicating to the driver that the low-beam filament is broken and that the high-beam filament is operating as the low-beam filament.

In the operation of the foregoing lighting safety circuit, ignition switch 22 is closed and dimming switch 36 is moved to the dimming or low-beam position. With the circuit closed in this manner, current will flow from the battery through resistor 38 and lead 34 to the low-beam filament 14, and thence to ground 40, causing the low-beam filament to light. With the low-beam filament operating properly, insufficient current flows through lead 50, resistor 60, relay 52 and ground 58 to operate relay 52; hence, switch 56 remains open. Should the low-beam filament burn out, the increased current provided by the battery through resistors 38 and 60 would become sufficient to operate relay 52 and close switch 56, permitting the current to flow through resistor 60, switch 56 and lead 54 to the high-beam filament. At this time, resistor 60 will function as a voltage-dropping resistor to dim the high-beam filament light, giving it approximately the same brightness as the standard low-beam filament light. At the same time, current will flow through the red light on the instrument panel in the driver's compartment, indicating that one of the low-beam lights is out. When the dimming switch is in the high-beam position connecting leads 30 and 42, current flows through low value resistor 46, and the bright high-beam lights function in the normal manner.

While only one embodiment of the present invention has been described in detail herein, various changes and modifications may be made without departing from the scope of the invention.

I claim:

1. A lighting safety device for a vehicle in combination with a battery, a ground for said battery and high-beam and low-beam filaments, comprising a first lead connecting said battery with the low-beam filament, a resistor in said lead, a second lead connecting said battery with the high-beam filament, a resistor in said second lead, a dimming switch in said leads for switching the current from said battery between said high-beam and low-beam filaments, a ground for said filaments, a relay having a switch and a coil, a third lead means connecting said first lead between the resistor and low beam filament to said coil and said relay switch, a resistor in said third lead, a fourth lead connecting said relay switch with the high-beam filament, the resistors in said first and third leads being of such value that the current flowing through the relay is insufficient to close the relay switch while the low-beam filament is in operating condition, a signal filament, a fifth lead connecting said signal filament to said fourth lead, and a ground for said signal filament.

2. A lighting safety device for a vehicle in combination with a current source and high-beam and low-beam filaments, comprising a first lead connecting said source with the low-beam filament, a resistor in said lead, a second lead connecting said source with the high-beam filament, a resistor in said second lead, a switch in said leads for switching the current from said source between said high-beam and low-beam filaments, a ground for said filaments, a relay having a switch and a coil, a third lead means connecting said first lead between the resistor and low beam filament to said coil and said relay switch, a resistor in said third lead, a fourth lead connecting said relay switch with the high-beam filament, a signal filament, a lead connecting said signal filament to said fourth lead, and a ground for said signal filament.

3. A lighting safety device for a vehicle in combination with a battery, a ground for said battery, and high-beam and low-beam filaments, comprising a first lead connecting said battery with the low-beam filament, a resistor in said lead, a second lead connecting said battery with the high-beam filament, a resistor in said second lead, a dimming switch in said leads for switching the current from said battery between said high-beam and low-beam filaments, a ground for said filaments, a relay having a switch and a coil, a third lead means connecting said first lead between the resistor and low beam filament to said coil and said relay switch, a resistor in said third lead, and a fourth lead connecting said relay switch with the high-beam filament, the resistors in said first and third leads being of such value that the current flowing through the relay is insufficient to close the relay switch while the low-beam filament is in operating condition.

4. A lighting safety device for a vehicle in combination with a current source and high-beam and low-beam filaments, comprising a first lead connecting said source with the low-beam filament, a resistor in said lead, a second lead connecting said source with the high-beam filament, a switch in said leads for switching the current from said source between said high-beam and low-beam filaments, a ground for said filaments, a relay having a switch and a coil, a third lead means connecting said first lead between the resistor and low beam filament to said coil and said relay switch, a resistor in said third lead, and a fourth lead connecting said relay switch with the high-beam filament.

References Cited by the Examiner

UNITED STATES PATENTS

| | | | |
|---|---|---|---|
| 2,100,695 | 11/1937 | Lackey | 315—83 |
| 2,223,251 | 11/1940 | Hack | 315—83 |
| 2,503,632 | 4/1950 | Prather | 315—83 |
| 2,528,245 | 10/1950 | Riggins | 315—83 |
| 2,571,981 | 10/1951 | Wensel | 315—83 |
| 2,693,551 | 11/1954 | Hall | 315—83 |

JAMES W. LAWRENCE, *Primary Examiner.*

DAVID J. GALVIN, *Examiner.*

C. R. CAMPBELL, *Assistant Examiner.*